Feb. 9, 1971   G. B. DAVIS   3,561,272
SPEED INDICATOR FOR CLUBS, BATS AND THE LIKE
Filed Dec. 20, 1968   2 Sheets-Sheet 1
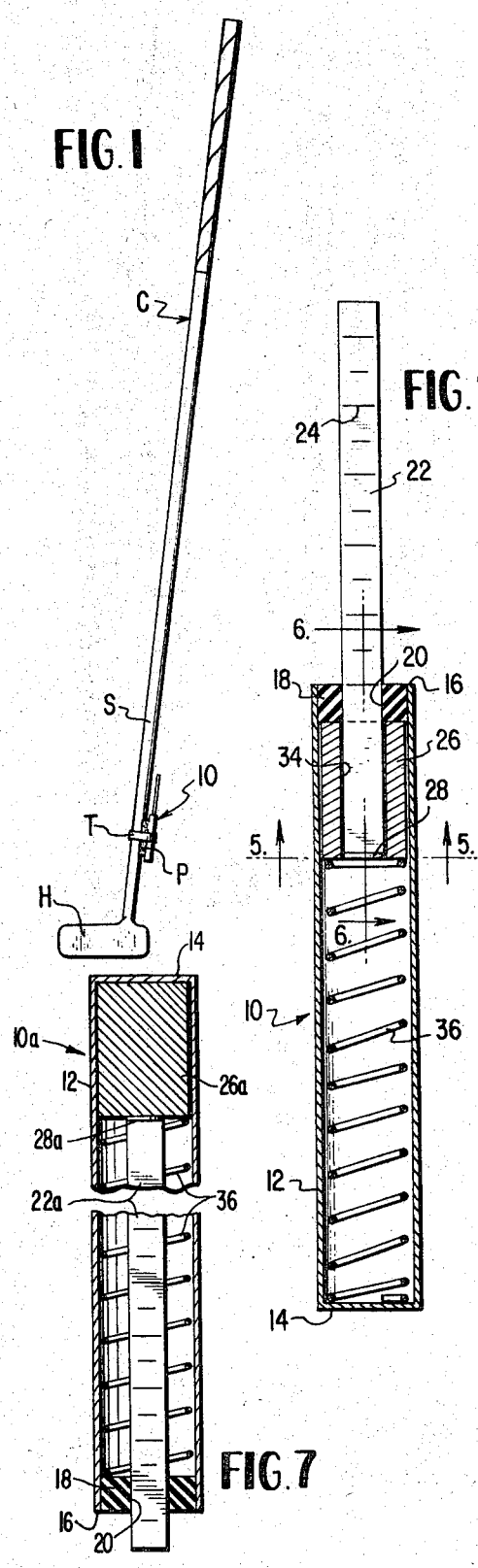
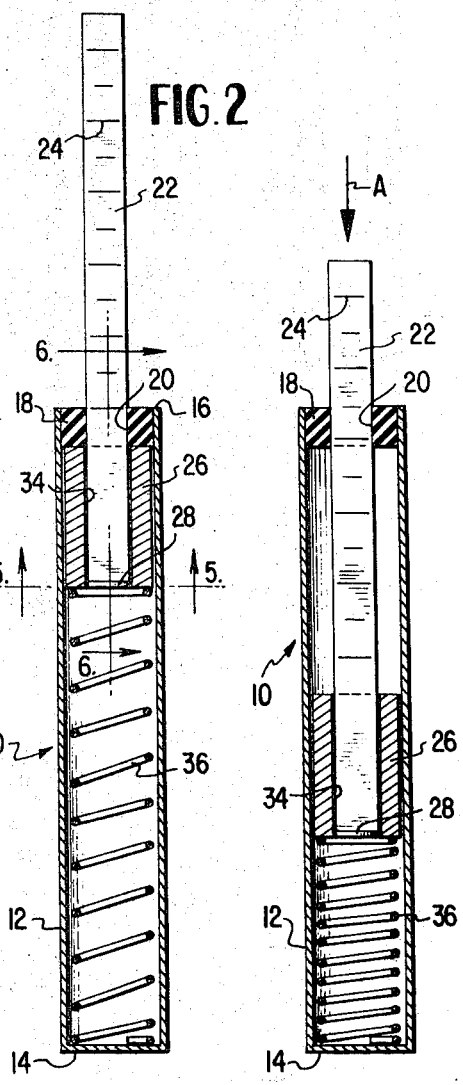
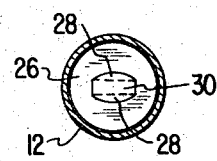
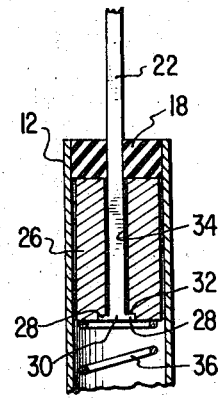
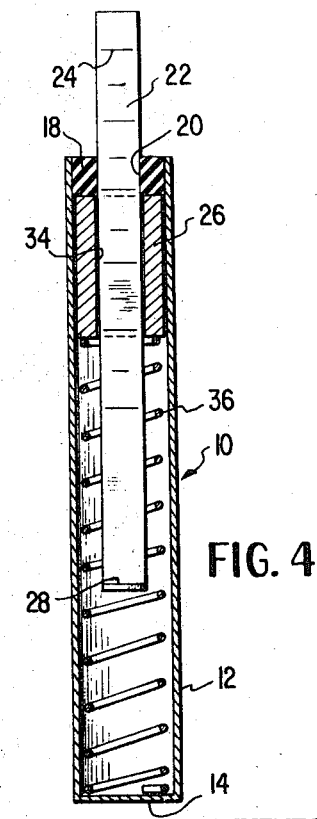
INVENTOR
GRADY B. DAVIS
BY 
ATTORNEYS Feb. 9, 1971   G. B. DAVIS   3,561,272
SPEED INDICATOR FOR CLUBS, BATS AND THE LIKE
Filed Dec. 20, 1968   2 Sheets-Sheet 2
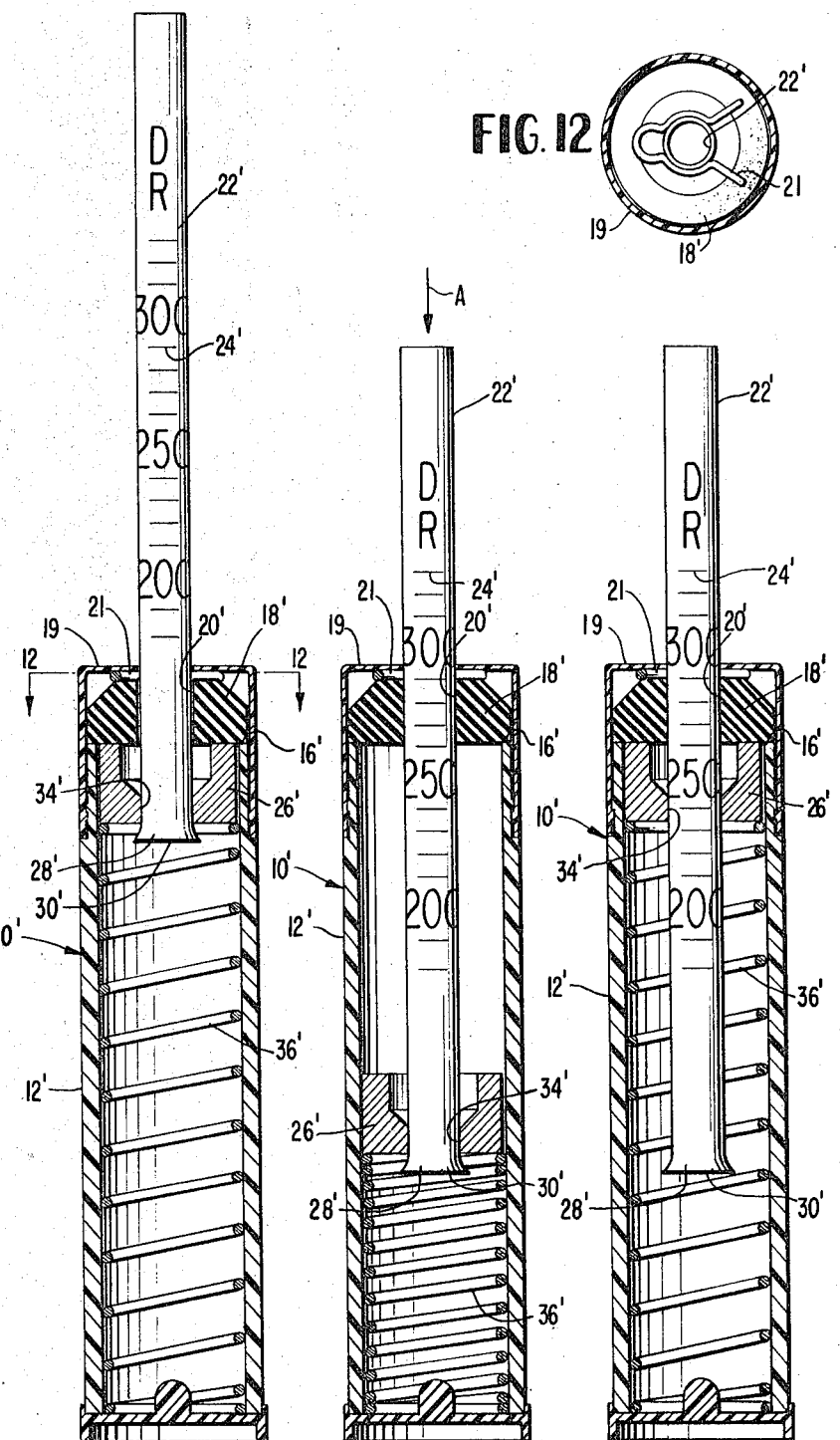
INVENTOR
GRADY B. DAVIS
BY *Smirie & Smiley*
ATTORNEYS

United States Patent Office 3,561,272
Patented Feb. 9, 1971

3,561,272
SPEED INDICATOR FOR CLUBS, BATS AND THE LIKE
Grady B. Davis, 1769½ Old Shell Road, Mobile, Ala. 36604
Continuation-in-part of application Ser. No. 652,897, July 12, 1967. This application Dec. 20, 1968, Ser. No. 785,725
Int. Cl. G01l 5/02
U.S. Cl. 73—379                                 7 Claims

ABSTRACT OF THE DISCLOSURE

A speed indicator for attachment to golf clubs, baseball bats or the like to register the speed of movement of the club head or striking portion of the bat from which the distance and velocity of flight of the ball may be calculated. The device is lightweight to avoid influence on the swing of the club, and includes a support releasably attachable to the club or bat adjacent the striking portion thereof, and a movable indicator carried by and frictionally engaging said support to retain a position relative to said support to which position it is moved by a weight which is spring retracted immediately upon termination of centrifugal force due to the swing of the club to avoid further influence on the indicator.

---

This application is a continuation-in-part of application Ser. No. 652,897, filed July 12, 1967, now abandoned.

BACKGROUND OF THE INVENTION

Speed or distance indicators of the type with which the present invention is concerned generally comprise a weighted indicator that is moved by centrifugal force against spring pressure and retained in the position to which is it moved by a pawl and ratchet engagement. This arrangement requires accurate selection of the spring to obtain uniform and accurate movement of the indicator, and release of the pawl and ratchet connection to return the indicator to initial position. The structures are relatively cumbersome and costly, and have sufficient weight to influence the swing of the club.

SUMMARY OF THE INVENTION

Briefly, one embodiment of the speed indicator device comprises an elongated housing closed at one end and open at its other end, and adapted to be secured to a golf club or the like by any suitable lightweight means. A collar of rubber or other elastic material or other resilient retainer slidingly but frictionally receives a calibrated stem or rod constituting an indicator, the inner end of which is within the housing and is freely engaged with a weight that is spring biased from stem engagement. Upon centrifugal force, the weight moves downwardly within the housing to drive the stem relative to the housing after which the weight is slidably returned to its initial position by the spring, whereas the stem is retained in the position to which it is moved by frictional engagement with the retainer so that the edge of the collar or cover enclosing the retainer may constitute an index with respect to the calibrations on the stem.

In another embodiment of the invention the indicator extends laterally through and is slidable in a slot extending longitudinally of the housing and is cooperative with calibrated scale means on the exterior of the housing. In this form, the indicator fractionally engages the housing wall to retain the position to which it is moved by the spring returned weight.

BRIEF DESCRIPTION OF THE DRAWING

FIG. 1 is a side view in elevation of a golf club having a speed indicator device according to the present invention attached to the club adjacent the head of the club;

FIGS. 2—4 are enlarged, longitudinal, cross-sectional views showing the indicator device in its initial, intermediate and final positions after operation by centrifugal force;

FIG. 5 is a cross-sectional view taken on line 5—5 of FIG. 2, and showing the lower end of the stem and weight;

FIG. 6 is a fragmentary cross-sectional view taken on line 6—6 of FIG. 2, and showing the connection between the stem and the weight;

FIG. 7 is a longitudinal cross-sectional view of a modified device;

FIG. 8 is an elevational view of another modification of the indicator device;

FIGS. 9–11 are enlarged, longitudinal, cross-sectional views showing the device of FIG. 8 in its initial, intermediate and final positions before, during and after operation by contrifugal force;

FIG. 12 is a cross-sectional view taken on line 12—12 of FIG. 9;

FIG. 13 is an elevational view of another modification of the indicator device; and FIG. 14 is an enlarged fragmentary cross-sectional view taken on line 14—14 of FIG. 13.

DETAILED DESCRIPTION OF THE INVENTION

Referring now to the drawing in detail and specifically to FIG. 1, the speed indicator device 10 according to the present invention is shown as attached to the shank S of a golf club C adjacent the head H of the club. Preferably, the indicator device is attached to the shank S as closely as possible to the head H. As the indicator must be retained relatively rigidly with respect to the club shank S and as added weight must be kept to a minimum, it is preferred to attach the indicator device 10 to the shank S by means of a strip of an adhesive tape T, such as a lightweight, pressure sensitive cellulosic tape. In addition, it is preferred to provide a small rubber pad P between the indicator device 10 and the shank S both to prevent slippage of the indicator and to avoid scratching the shank S or the indicator device.

Referring now more particularly to FIG. 2, it will be seen that the indicator device 10 comprises an elongated housing 12 having a closed lower end 14 and an open upper end 16. This housing may be formed of any suitable lightweight material, such as aluminum or synthetic plastic. The object is to provide sufficient strength and rigidity with the minimum of weight. The open upper end 16 of the housing is closed by a collar 18 which preferably is formed of rubber or other elastic material, and this collar is provided with a slot 20 centrally thereof and through which extends a stem or rod 22.

The collar 18 resiliently and frictionally embraces the stem 22 and thereby inhibits free movement of the stem through the slot 20. The stem 22 is provided with a calibrated scale 24 on at least one face thereof, and preferably has two scales respectively on opposite sides thereof, one scale calibrated for heavy clubs such as a driver and the other scale calibrated for lighter clubs such as irons. The inner end of the stem or rod 22 is slidably surrounded by a weight 26 within the housing 12, and driving engagement between the weight 26 and the stem 22 is effected by means of laterally extending lips 28 on the lower end 30 of the stem.

The lips 28 are best shown in FIG. 5, and preferably the weight 26 has recesses 32 within its lower end and opening into a slot 34 axially through the weight and through which the stem 22 passes. The weight 26 has clearance both with respect to the inner wall of the housing 12 and between the inner wall of the slot 34 and the stem 22 so that the weight and stem are freely slidable relative to each other. A spring 36 is disposed within the housing and is under compression between the housing bottom 14 and the lower end of the weight 26.

In operation, the indicator device is attached to the club or bat as hereinbefore described, and the stem is pulled outwardly of the housing to its maximum extent so that the lips 28 on its lower end 30 are nested within the recesses 32 in the weight 26, and the weight 26 is abutted against the inner side of the collar 18. During the swing of the club, bat or the like, the centrifugal force, indicated by arrow A in FIG. 3, causes the weight 26 to move downwardly within the housing 12 compressing the spring 36 and drawing the stem 22 into the housing. As soon as the centrifugal force is released, the spring 36 then drives the weight 26 back to the upper end of the housing but, due to the frictional engagement between the stem 22 and the collar 18, the stem is retained at the lower or innermost position so that the calibrated scale 24 may be read with respect to the indexing edge of the slot 20 in the collar 18. While the lips 28 and the lower end 30 of the stem are sufficient to drivingly engage the weight with the stem, they do not extend sufficiently to interfere with the operation of the spring 36.

Obviously, the device may be so arranged that the stem is expelled from rather than drawn into the housing by centrifugal force. Referring to FIG. 7, the device 10a comprises a housing 12 identical to that shown in FIGS. 2-4 except that the housing is inverted with the closed end 14 at the top and the open end 16 at the bottom. A stem 22a extends through the slot 20 of the collar 18 and the inner end of the stem is engageable by a weight 26a biased by a spring 36. The weight 26a may be solid in view of the fact that it merely engages and does not surround the stem. The stem may be provided at its inner end with lips 28a to present a flat abutment surface to the weight.

Another and preferred modification of the indicator is shown in FIGS. 8-11 wherein the device 10' comprises a casing or housing 12' having a closed bottom 14' and a cap 19 enclosing the open upper end 16' of the housing. The indicator stem 22' having a calibrated scale 24' thereon is cylindrical, and the inner end 30' thereof has a flared portion 28' to be engaged by the weight 26' which has an axial bore 34' through which the stem extends. A washerlike element 18' is seated on the upper open end 16' of the housing, and has an axial bore 20' through which the stem freely passes.

The frictional engagement between the stem and the housing is provided by a hairpin-like spring 21, best shown in FIG. 12, which frictionally embraces the stem 22' and is trapped between the washer 18' and the cap 19. In other respects, the structure and operation of this modification is substantially identical to that shown and described with respect to FIGS. 2-6, the weight 26' being biased by a spring 36', and FIGS. 9-10 showing the same relative positions as shown and described with respect to FIGS. 2-4.

A still further modification of the device is shown in FIGS. 13 and 14 wherein the indicator constitutes a transversely disposed pointer 22b which is slidable in a slot 20b extending longitudinally of the housing 12b, and opening through the upper open end 16b of said housing. The indicator member 22b is provided with a spring element 23 on the inner side thereof to resiliently and frictionally embrace the housing walls bordering the slot 20b. The housing walls bordering the slot have recesses 23b to accommodate the spring 23 and avoid interference with the weight driving spring 36b. The weight 26b is provided with a stud 27 extending radially into the slot 20b and overlying the indicator element 22b. The upper end 16b of the housing is closed by a plug or cap 18b.

The operation of this modification is identical to those previously described in that centrifugal force drives the weight 26b downwardly so that its stud 27 moves the indicator member 22b longitudinally of the slot 20b, and then upon cessation of centrifugal force, the weight immediately is returned to its initial position at the upper end of the housing; whereas the indicator is frictionally retained at the point to which it was driven for reading with respect to either one of the calibrated scales 24b which flank the slot 20b.

The materials from which the indicator is fabricated are so selected as to provide sufficient ruggedness and strength but with a minimum of weight so as to avoid any influence on the normal swing of the club or bat. A prototype indicator weighs ⅝ of an ounce, but production models will weigh a maximum of ⅜ of an ounce. This weight is sufficiently insignificant to not affect the stroke of the club.

It has been found that the device has many uses, particularly with respect to golf clubs, other than merely indicating power and distance. For instance, the device can be used to assist in developing a swing giving greater distance, to develop the selection of stiffness of the club shaft to obtain greatest distance, to determine the weight of the clubs best suited to the individual, and also to determine the compression of the golf ball best adapted to the stroke of the individual.

What is claimed is:

1. A speed indicator device for clubs, bats and the like comprising in combination,
   support means for attachment to the club,
   weight means slidably carried by said support means for movement back and forth in a path along which the measurement is to be taken,
   spring means normally urging said weight means in one direction to a predetermined position along said path, whereby the spring means opposes movement of the weight means during measurement,
   measuring means,
   means for carrying said measuring means with said weight means only when the weight means is moved from said predetermined position thereof in the measurement direction, and
   friction means engaging said measuring means to retain the measuring means in a position to which it is carried by said weight means,
   said support means being a tube having a closed end, said weight means being of a configuration for sliding in said tube, said spring means being seated on the closed end of the tube and reacting against said weight means, the end opposite the closed end of said support means being closed by closure means having an opening therein, said measuring means is in the form of a stem slidably projecting through said opening and having a calibrated scale thereon for indexing with the edge defining said opening, said weight means being reciprocably disposed on said stem, and said means for carrying said measuring means comprising,
   an abutment portion on said stem engageable beneath said weight means.

2. The speed indicator according to claim 1, wherein said closure means comprises a collar fitted within said tube remote from said closed end thereof, said stem projecting through said collar and being frictionally embraced thereby.

3. The speed indicator according to claim 1 wherein said friction means comprises a spring clamp embracing said stem and trapped by said closure means.

4. A speed indicator for clubs, bats and the like, comprising a support for attachment to the club, a collar carried by said support and having a slot therethrough, and a calibrated stem slidably extending through said slot but frictionally engaged by said collar, a weight slidably carried by said support and drivingly connected with the inner end of said stem, a coiled spring in said support and acting between one end of the support and said weight, said weight slidably surrounding the inner end portion of said stem and at its inner end said stem being extended laterally to be engaged and driven by said weight in one direction only.

5. An indicator according to claim 4 wherein said stem comprises a flat strip, said weight having an axially disposed slot through which said strip passes with clearance to permit free slidable movement therebetween said lateral extension on the inner end of said stem comprising flanges extending from the longer sides thereof, said weight having recesses in its inner end opening into said slot to completely nest said flanges, and the diameter of said coiled spring being greater than any transverse dimension of said stem and flanges.

6. A speed indicator as claimed in claim 4, in which said collar includes a hairpin-like spring transversely flanking and frictionally engaging said stem.

7. The structures claimed in claim 6, in which said housing includes a cap element engaged on said support and overlying said hairpin-like spring, and a cushion element trapped between said cap element and said support and disposed beneath said hairpin-like spring, said stem extending through said cushion element and being freely reciprocable with respect to said cushion element.

References Cited
UNITED STATES PATENTS

| | | | |
|---|---|---|---|
| 280,491 | 7/1883 | Mackay | 73—141 |
| 1,020,551 | 3/1912 | Harania | 73—379 |
| 1,538,654 | 5/1925 | Reach | 73—380 |
| 2,049,532 | 8/1936 | Williams | 73—396 |
| 2,096,328 | 10/1937 | Iskyan | 73—396 |
| 2,223,647 | 12/1940 | Stumpf | 73—380 |
| 2,543,722 | 2/1951 | Hetzel | 73—493 |
| 2,924,100 | 2/1960 | Price | 73—396 |
| 2,986,937 | 6/1961 | Chapman | 73—379 |

JAMES J. GILL, Primary Examiner

H. GOLDSTEIN, Assistant Examiner

U.S. Cl. X.R.

73—492, 493; 273—194